Aug. 21, 1923.
G. L. CARPENTER
1,465,508
ATTACHMENT FOR COOKING VESSELS
Filed March 30, 1922
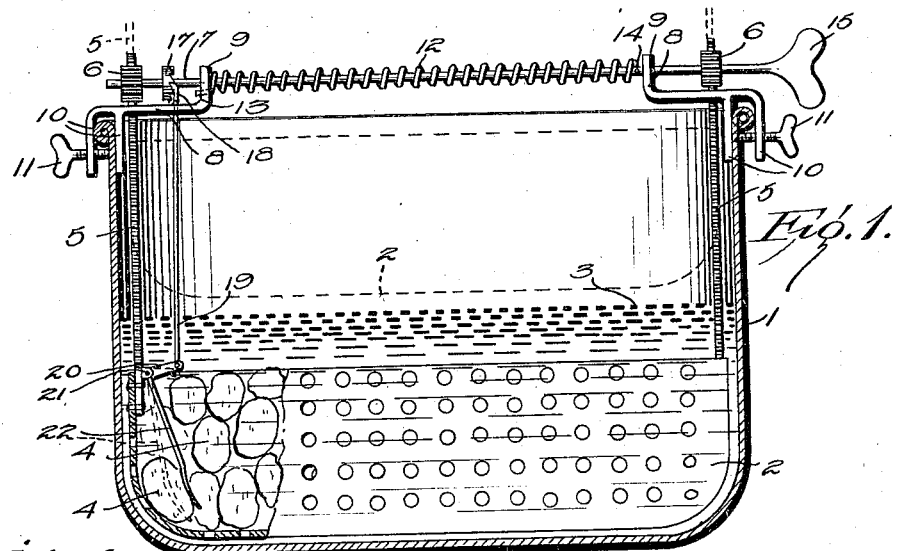
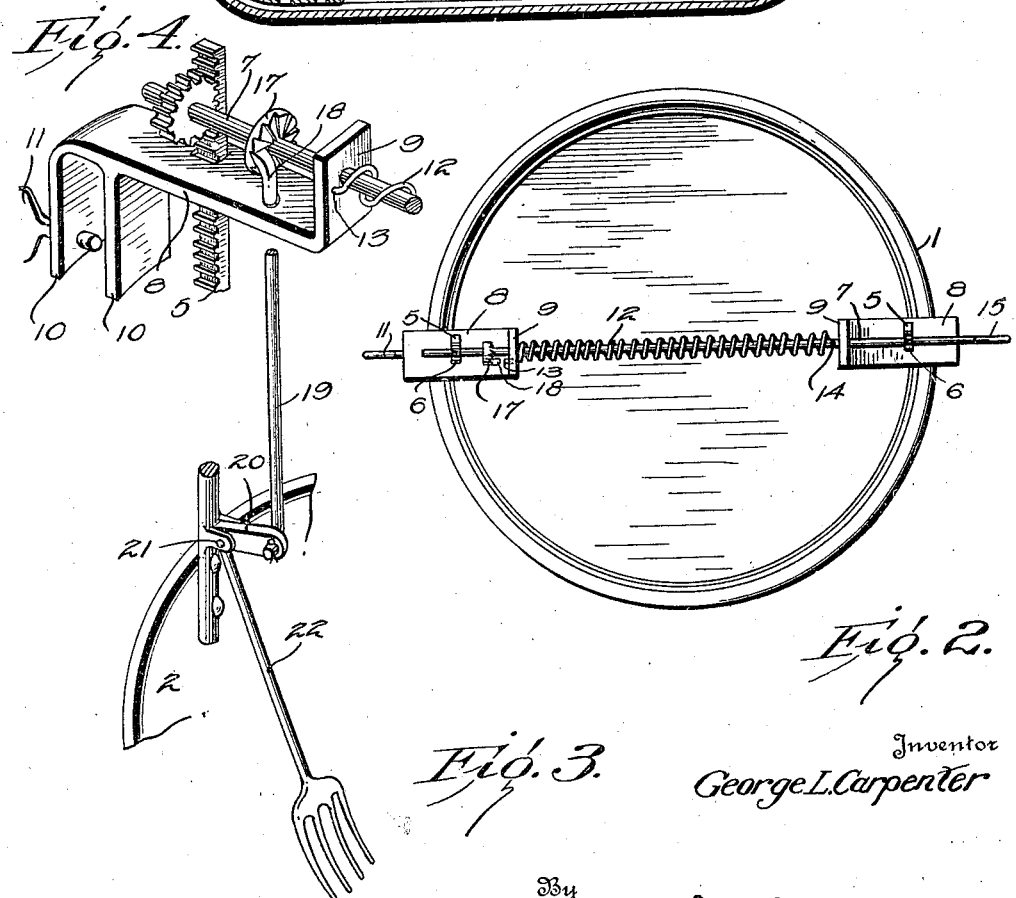
Inventor
George L. Carpenter Patented Aug. 21, 1923.

1,465,508

UNITED STATES PATENT OFFICE.

GEORGE L. CARPENTER, OF GLADSTONE, MICHIGAN.

ATTACHMENT FOR COOKING VESSELS.

Application filed March 30, 1922. Serial No. 548,215.

*To all whom it may concern:*

Be it known that I, GEORGE L. CARPENTER, a citizen of the United States, residing at Gladstone, in the county of Delta and State of Michigan, have invented certain new and useful Improvements in Attachments for Cooking Vessels, of which the following is a specification.

This invention relates to attachments for domestic cooking vessels, and more particularly to means for removing and draining vegetables when they are cooked to the desired degree.

An object of the invention is the provision of means controlled by the condition of the vegetables being cooked, to automatically remove them from the effects of further cooking and burning when they are cooked to the desired degree.

A further object of the invention is the provision of a trigger to control the mechanism, which trigger is held in position by one of the vegetables being cooked.

A further object of the invention is the provision of means for automatically raising the vegetables from the cooking vessel and release mechanism therefor, operated by the trigger.

In the accompanying drawings, I have shown one embodiment of the invention. In this showing:

Figure 1 is a vertical sectional view of a cooking vessel showing the invention applied, Figure 2 is a plan view thereof, Figure 3 is a detail view of the trigger, and, Figure 4 is a perspective view of a bracket employed in securing the attachment to the cooking vessel.

Referring to the drawings, the reference numeral 1 designates a cooking vessel of any type and 2 represents a perforated container adapted to be arranged in the cooking vessel beneath the water level indicated at 3. The perforated container is adapted to contain vegetables 4, to be cooked. A pair of rack bars 5 are secured to the perforated container and extend upwardly beyond the top of the cooking vessel. These rack bars are adapted to mesh with pinions 6, mounted on a shaft 7. As shown, the shaft is supported in suitable brackets 8. The construction of the bracket is shown in detail in Figure 4 of the drawings. It comprises a body portion having upstanding ends 9 forming bearings for the reception of the shaft and is further provided with a pair of downwardly extending spaced flanges 10 adapted to fit over the edge of the vessel. A set screw 11 is arranged in the outer flange to permit securing it to the side of the vessel.

A spring 12 is arranged around the shaft 7 and has one end secured to one of the brackets, as indicated at 13. The other end is secured to the shaft, as at 14. The shaft is provided with a handle 15, by means of which the spring may be wound.

A ratchet wheel 17 is arranged on the shaft 7 and this wheel is adapted to engage a pawl 18, carried by a rod 19, which extends downwardly and into the cooking vessel. The lower end of this rod is pivotally connected to a link 20 which is supported in suitable bearings 21 on the side of the perforated container. This link is connected to a fork 22, which extends downwardly into the perforated container but is adapted to be held at an angle to the side of the container by one of the vegetables being cooked (see Figure 1).

The operation of the device is as follows:

The perforated container is arranged in the vessel, the vegetables to be cooked are placed therein with one of the larger vegetables arranged behind the fork 22. Water is then placed in the vessel to the desired height and the shaft 7 placed in position by attaching the brackets 8 to the pan. The racks 5 extend through openings in the bracket 8, and mesh with gears 6. The spring 12 is first wound, before the racks and pinions are brought into mesh, and is held in this position by the tooth 18, engaging one of the teeth of the ratchet wheel. The fork 22 serves as a trigger to hold the tooth 18 in this position, and the cooking proceeds until the vegetable behind the fork becomes softened when the tension of the spring is great enough to force the fork inwardly to the dotted line position shown in Figure 1 of the drawings, permitting the rod 19 to lower and release the ratchet. The shaft 7 then revolves, revolving the pinion 6 and lifting the perforated container to the dotted line position above the water level, and an appreciable distance from the source of heat below the vessel. The vegetables are then drained and are prevented from burning by the distance from the source of heat.

It will be apparent that the contents of the perforated container will be removed from the cooking zone when they are sufficiently cooked and will be prevented from burning even if the attendant does not immediately remove them from the stove.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. An attachment for cooking vessels, comprising a perforated container adapted to be arranged in the bottom of the vessel and contain vegetables to be cooked, means for raising said container, and means controlled by the vegetables when in their normal uncooked condition to retain said raising means in inoperative position and to permit operation of said raising means when the vegetables are cooked.

2. An attachment for cooking vessels, comprising a perforated container adapted to be arranged in the bottom of the vessel and contain the vegetables to be cooked, a spring to move said container upwardly, and means controlled by the vegetables in their normal uncooked condition to prevent said spring from functioning until the vegetables are cooked and to permit said spring to raise said container when the vegetables are cooked.

3. An attachment for cooking vessels, comprising a perforated container adapted to be arranged in the bottom of the vessel and contain the vegetables to be cooked, a rotatable shaft arranged adjacent the top of the vessel, pinions mounted on said shaft, rack bars secured to said container and meshing with said pinions, a spring mounted on said shaft and adapted to revolve said shaft to raise said container from the vessel, and means controlled by the vegetables when in their normal uncooked condition to prevent said spring from functioning and to permit said spring to revolve said shaft when the vegetables are cooked.

4. An attachment for cooking vessels, comprising a perforated container adapted to be arranged in the bottom of the vessel and contain the vegetables to be cooked, a rotatable shaft arranged adjacent the top of the vessel, pinions mounted on said shaft, rack bars secured to said container and meshing with said pinions, a spring mounted on said shaft and adapted to revolve said shaft to raise said container from the vessel, a ratchet wheel secured to said shaft, and a ratchet engaging said wheel to normally prevent revolution of said shaft, said ratchet being released by the softening of the vegetables as they cook.

5. An attachment for cooking vessels, comprising a perforated container adapted to be arranged in the bottom of the vessel and contain vegetables to be cooked, a rotatable shaft arranged adjacent the top of the vessel, pinions mounted on said shaft, rack bars secured to said container and meshing with said pinion, a spring mounted on said shaft and adapted to revolve said shaft to raise said container from the vessel, a ratchet wheel secured to said shaft, a lever carried by said container and extending upwardly, said lever being provided with a toothed end adapted to engage one of the teeth of the ratchet wheel, and a fork connected to said lever and adapted to be retained at a distance from the side of the container by one of the vegetables, said fork being adapted to move toward the side of the container as the vegetables soften in cooking and release said ratchet to permit said shaft to revolve and raise said container.

In testimony whereof I affix my signature in presence of two witnesses.

GEO. L. CARPENTER.

Witnesses:
PETER N. PETERSON,
ELINA PETERSON.